Figure 1:
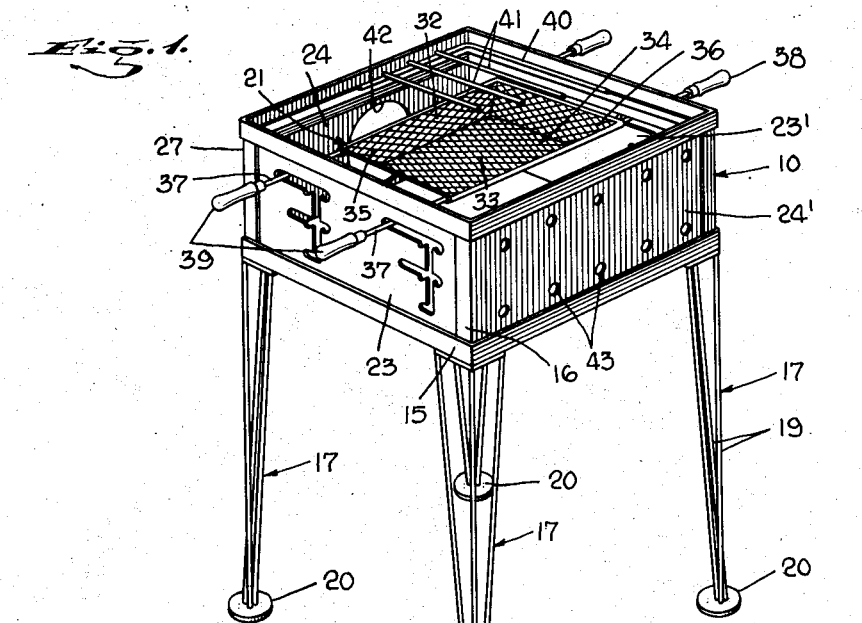

May 19, 1953 C. P. MOLLA 2,638,888
BARBECUE DEVICE
Filed Dec. 8, 1949

INVENTOR
CHARLES P. MOLLA
BY
Howell Thompson
ATTORNEY

Patented May 19, 1953

2,638,888

UNITED STATES PATENT OFFICE 2,638,888

BARBECUE DEVICE

Charles P. Molla, New Hyde Park, N. Y., assignor to Molla Incorporated, New York, N. Y., a corporation of New York Application December 8, 1949, Serial No. 131,808

9 Claims. (Cl. 126—25)

This invention relates to what is commonly referred to as a barbecue device. More particularly, the invention deals with a device of the character described employing a fuel supporting tray of openwork construction with means comprising a pair of parallel elongated rods at opposed sides of the tray and on the framework of the device for adjusting the tray into numerous positions in the device in controlling broiling of food disposed upon a grill at the upper portion of the framework of the device. Still more particularly, the invention deals with a device of the character described having means for producing a forced draught to stimulate the burning of the fuel in the tray, particularly in the early stages of developing and producing a bed of hot coals.

Figure 2:
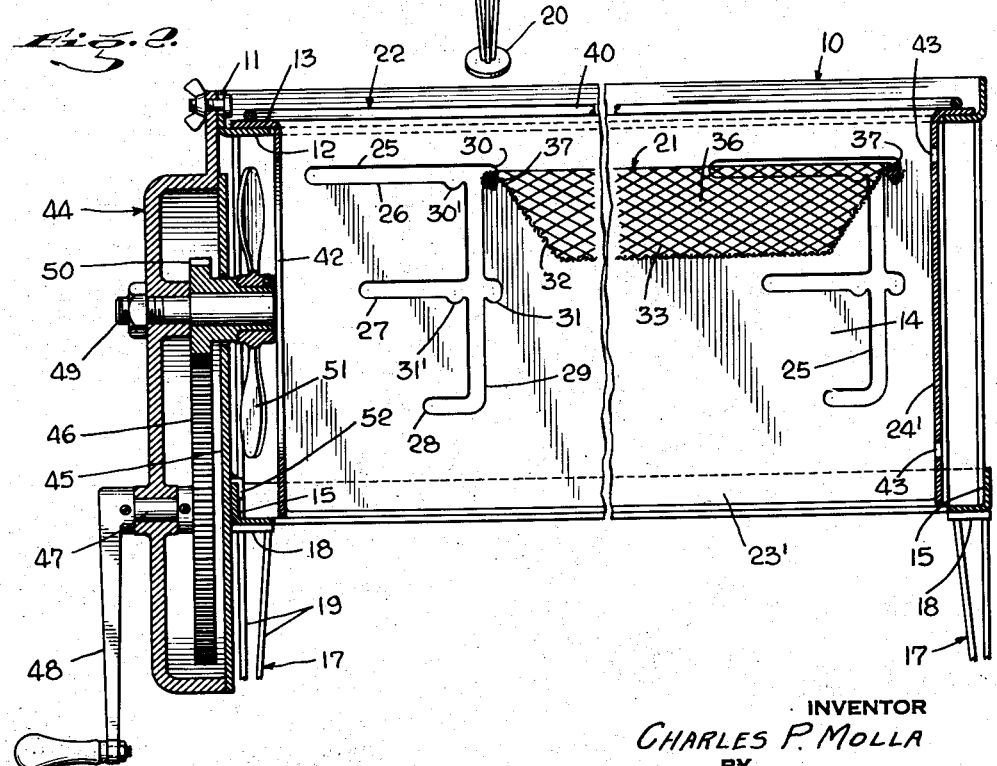

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a perspective view of a device made according to my invention, with parts of the construction broken away and with parts in section; and Fig. 2 is a partial section on the line 2—2 of Fig. 1.

In barbecue devices of the kind under consideration, which may be termed "portable barbecues" that can be moved about from place to place, it is the usual custom to provide a fixed firebox or fuel supporting member which has a definite or fixed positioning and spacing with respect to the grill which necessitates the shifting of food about on the grill in order to control the proper preparation of the food.

My improved device employs means, such for example as a shiftable fuel supporting tray, which makes it possible to move the fire into different positions in the apparatus to control the preparation of the food without the necessity of having to shift the food from place to place over the grill, particularly when it is desired to simply keep prepared food warm.

In the accompanying drawing, I have shown one adaptation of my invention and, in the drawing, 10 represents a rectangular frame comprising an upper border frame 11 of L-shaped or angle-iron cross-sectional form, the flange 12 of which is directed inwardly to form a supporting flange for an outwardly extending flange edge 13 on a box-shaped casing part 14. The frame 10 also includes a lower rectangular frame 15, substantially similar to the frame 11, joined to and spaced from the frame 11 by angleiron corner risers 16, the latter being welded to the frames 11 and 15.

Detachably secured to the corner portions of the frame 15 are leg members 17 which have upper L-shaped portions 18 bolted to the frame 15. Depending from the L-shaped portions 18 are three angularly disposed rods 19 united at their lower ends in disc-type feet 20. In this connection, it will be understood that any type of foot or base support can be provided.

Adjustably and detachably supported with the frame 10 or the casing 14 thereof is what I will term a "firebox unit" 21 and, at 22, is a detachable grill.

The casing 14 has similar front and rear walls 23, 23' and side walls 24, 24'. As the walls 23, 23' are identical, the brief description of one will apply to both.

The front and back walls have what might be termed "inverted-F cutouts," generally identified by the reference characters 25. These cutouts comprise a long horizontal top slot 26, a somewhat shorter intermediate slot 27 and still shorter lower slot 28. The slots 26, 27 and 28 communicate with a vertical slot 29 and it will appear that the slots 26 and 27 cross the vertical slot 29 to form supporting ends 30, 31, respectively, which are slightly depressed to retain rods in the firebox, later described, in a definite position. The slots 26, 27 have corresponding depressions at the other side of the vertical slots, as at 30', 31' for the same purpose.

The slots 26 are so-arranged on the walls 23, 23' as to facilitate adjustment of the firebox unit 21 in different positions across the frame and this, in combination with the back and forth movement of the firebox unit, facilitates positioning of the firebox proper 32 into numerous positions over the entire area of the frame 10.

The firebox 32 is formed from stamped sheet metal and is of openwork structure having diamond-shaped openings 33 and the sheet is pressed downwardly to form a bottom wall 34 and upwardly and outwardly flared side walls 35 and end walls 36, welded or otherwise secured to the edges of the side walls 35 are long rods 37. The rear ends of the rods have detachable stops 38 which check forward movement of the firebox in the frame and the forward ends of the rods have detachable handle members of insulating material, as at 39. The structure is such that the rods 37 can be pulled through and detached from one of the walls, for example, the wall 23', when the stops 38 are removed and then pulled through the other wall when the handles 39 are removed. This construction facilitates collapsing of the entire barbecue device, keeping in mind that the legs 17 are also detachable.

The grill 22 is in the form of a rectangular rod frame 40 having a series of parallel strips or rods 41 welded to sides of the frame 40. The grill seats in the upper frame 11 upon the flange 13 of the casing 14. The side wall 24 has a large opening 42 centrally thereof and the opposed wall 24' has a series of small vent openings 43. At 44 is shown a blower or fan device comprising a casing 45, in which is mounted a large gear 46, on an axis 47 of which, outwardly of the casing, is an operating crank 48.

In the upper portion of the casing is a fan-shaft 49, to which is secured a pinion 50 which meshes with the gear 46. On the shaft 49 is a movable blade fan 51 which is adapted to be positioned in alinement with the aperture 42, so that in rotating this fan at high speed through the medium of the crank 48, air can intermittently be blown across the casing 14 to periodically stimulate the burning of the fuel in the firebox 21.

On the back of the casing 45, adjacent the lower end thereof, are a pair of depending hooks 52 adapted to engage the lower frame 15 and, at the top of the casing 45, is a clamp 53 for securing the fan unit 44 firmly in position on the upper frame 11.

By being able to shift the fire in the firebox proper 32 into different positions over the area of the casing or pan 14, the fire can be concentrated to different areas of the grill 22 in intense or quick cooking of food products thereon, while other areas may be utilized to simply keep the food warm. Furthermore, the firebox can be dropped into engagement with the slots 27 and adjusted into different positions, but here the radiation spreads to a greater extent and the intensity of heat is minimized.

When it is desired to provide slow cooking or simply maintain cooked food in a warm state, the firebox can be lowered for engagement with the lower slots 28.

Having fully described my invention, what I claim as new and desire to secure by Letters Patent is:

1. A barbecue device of the class described, comprising a rectangular frame, defined by upper and lower angleiron members joined by corner posts, legs detachable with respect to the frame, a casing detachably mounted upon the upper angleiron member of the frame, opposed walls of the casing having pairs of substantially inverted F-shaped apertures, the apertures in one wall being in alinement with those of the opposed wall, a firebox unit including a pair of rods movably mounted in said apertures to adjust the position of the firebox horizontally and vertically in the casing, and a grill detachably mounted on the upper end portion of the casing.

2. A barbecue device of the class described, comprising a rectangular frame, defined by upper and lower angleiron members joined by corner posts, legs detachable with respect to the frame, a casing detachably mounted upon the upper angleiron member of the frame, opposed walls of the casing having pairs of substantially inverted F-shaped apertures, the apertures in one wall being in alinement with those of the opposed wall, a firebox unit including a pair of rods movably mounted in said apertures to adjust the position of the firebox horizontally and vertically in the casing, a grill detachably mounted on the upper end portion of the casing, and said firebox comprising an openwork receptacle having upwardly flaring side and end walls.

3. A barbecue device of the class described, comprising a rectangular frame, defined by upper and lower angleiron members joined by corner posts, legs detachable with respect to the frame, a casing detachably mounted upon the upper angleiron member of the frame, opposed walls of the casing having pairs of substantially inverted F-shaped apertures, the apertures in one wall being in alinement with those of the opposed wall, a firebox unit including a pair of rods movably mounted in said apertures to adjust the position of the firebox horizontally and vertically in the casing, a grill detachably mounted on the upper end portion of the casing, said firebox comprising an openwork receptacle having upwardly flaring side and end walls, and the ends of the rods of the firebox unit having detachable members.

4. A barbecue device of the class described, comprising a rectangular frame, defined by upper and lower angleiron members joined by corner posts, legs detachable with respect to the frame, a casing detachably mounted upon the upper angleiron member of the frame, opposed walls of the casing having pairs of substantially inverted F-shaped apertures, the apertures in one wall being in alinement with those of the opposed wall, a firebox unit including a pair of rods movably mounted in said apertures to adjust the position of the firebox horizontally and vertically in the casing, a grill detachably mounted on the upper end portion of the casing, said firebox comprising an openwork receptacle having upwardly flaring side and end walls, the ends of the rods of the firebox unit having detachable members, other opposed walls of said casing being provided one with a large ventilating aperture and the other with small vent apertures, and means detachably mounted in connection with the frame for supporting a fan unit in registering position with said large aperture.

5. A barbecue device of the class described, comprising a rectangular frame, defined by upper and lower angleiron members joined by corner posts, legs detachable with respect to the frame, a casing detachably mounted upon the upper angleiron member of the frame, opposed walls of the casing having pairs of substantially inverted F-shaped apertures, the apertures in one wall being in alinement with those of the opposed wall, a firebox unit including a pair of rods movably mounted in said apertures to adjust the position of the firebox horizontally and vertically in the casing, a grill detachably mounted on the upper end portion of the casing, said firebox comprising an openwork receptacle having upwardly flaring side and end walls, the ends of the rods of the firebox unit having detachable members, other opposed walls of said casing being provided one with a large ventilating aperture and the other with small vent apertures, means detachably mounted in connection with the frame for supporting a fan unit in registering position with said large aperture, said fan unit comprising a casing, means on the fan casing for engaging the lower angleiron member of the frame, and means detachably coupling the upper end of the fan casing with the upper angleiron member of the frame.

6. A barbecue device of the class described, comprising a rectangular frame, defined by upper and lower angleiron members joined by corner posts, legs detachable with respect to the frame, a casing detachably mounted upon the upper angleiron member of the frame, opposed walls of the casing having pairs of substantially inverted F-shaped apertures, the apertures in one wall being in alinement with those of the opposed wall, a firebox unit including a pair of rods movably mounted in said apertures to adjust the position of the firebox horizontally and vertically in the casing, a grill detachably mounted on the upper end portion of the casing, and means detachable with respect to the frame for providing a forced draught for the firebox.

7. A barbecue device of the class described, comprising a rectangular frame, defined by upper and lower angleiron members joined by corner posts, legs detachable with respect to the frame, a casing detachably mounted upon the upper angleiron member of the frame, opposed walls of the casing having pairs of substantially inverted F-shaped apertures, the apertures in one wall being in alinement with those of the opposed wall, a firebox unit including a pair of rods movably mounted in said apertures to adjust the position of the firebox horizontally and vertically in the casing, a grill detachably mounted on the upper end portion of the casing, means detachable with respect to the frame for providing a forced draught for the firebox, and said last named means comprising a fan unit.

8. A barbecue device of the class described, comprising a box-shaped upper casing portion, legs depending from the casing, a firebox unit arranged in said casing and of a cross-sectional area considerably less than the corresponding area of the casing for free horizontal movement therein, and means on the firebox unit engaging vertically spaced intercommunicating apertures on opposed walls of the casing for adjustably supporting the firebox unit, whereby, when the device is in use, said unit can be adjusted into different horizontal and vertical positions in controlling the preparation of food without removal of the firebox from said casing.

9. A barbecue device of the class described, comprising a box-shaped upper casing portion, legs depending from said casing, a firebox unit arranged in said casing and of a cross-sectional area considerably less than the corresponding area of the casing for free horizontal movement therein, means on the firebox unit engaging vertically spaced intercommunicating apertures on opposed walls of the casing for adjustably supporting the firebox unit, whereby, when the device is in use, said unit can be adjusted into different horizontal and vertical positions in controlling the preparation of food without removal of the firebox from said casing, and means providing a forced circulation of air in the casing and around the firebox unit.

CHARLES P. MOLLA.

References Cited in the file of this patent

UNITED STATES PATENTS

| Number | Name | Date |
| --- | --- | --- |
| 174,650 | Williams | Mar. 14, 1876 |
| 1,069,802 | Mokry | Aug. 12, 1913 |
| 2,033,898 | Krebs | Mar. 10, 1936 |
| 2,221,098 | Langsam | Nov. 12, 1940 |
| 2,349,617 | Gorman | May 23, 1944 |
| 2,425,036 | Howe | Aug. 5, 1947 |
| 2,511,594 | Loffredo | June 13, 1950 |